Jan. 8, 1952 L. C. ABRAHAM 2,581,779
SCOURING PAD AND PROCESS OF MANUFACTURING THE SAME
Filed July 16, 1947 3 Sheets-Sheet 1
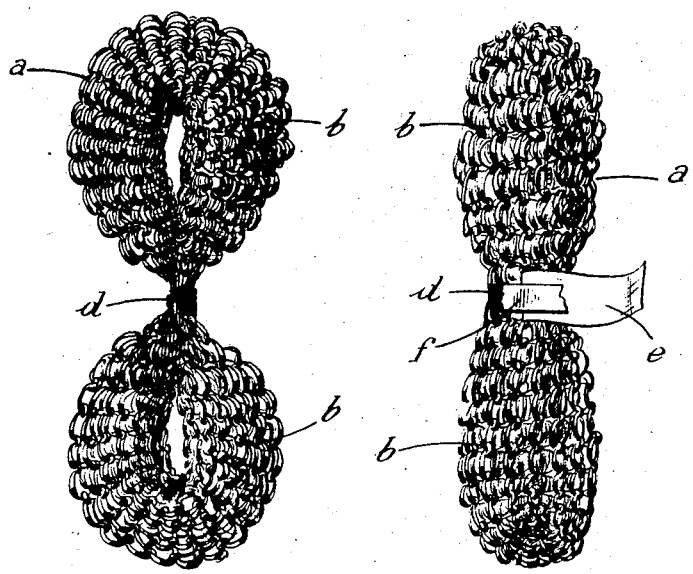
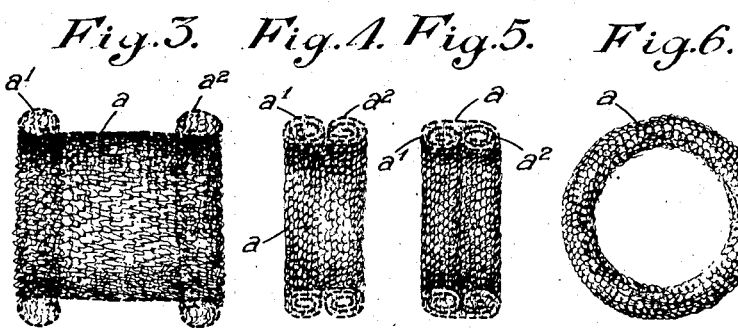
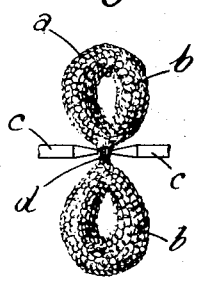 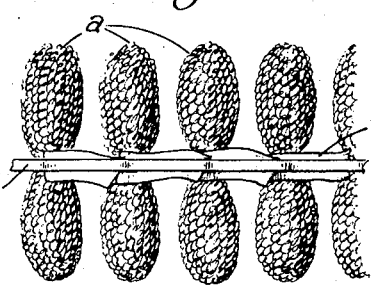 

Jan. 8, 1952 — L. C. ABRAHAM — 2,581,779
SCOURING PAD AND PROCESS OF MANUFACTURING THE SAME
Filed July 16, 1947 — 3 Sheets-Sheet 2

Inventor:
L. C. Abraham.

Jan. 8, 1952 L. C. ABRAHAM 2,581,779
SCOURING PAD AND PROCESS OF MANUFACTURING THE SAME
Filed July 16, 1947 3 Sheets-Sheet 3

Inventor:
L. C. Abraham
By C. F. Obendorth
Atty

Patented Jan. 8, 1952

2,581,779

UNITED STATES PATENT OFFICE 2,581,779

SCOURING PAD AND PROCESS OF MANUFACTURING THE SAME

Lewis Crowford Abraham, Auderghem-Brussels, Belgium

Application July 16, 1947, Serial No. 761,319
In Belgium October 28, 1940

Section 1, Public Law 690, August 8, 1946
Patent expires October 28, 1960

9 Claims. (Cl. 15—209)

The present invention relates to a scouring pad having a greater ease of manipulation and a long life, compared with ordinary scouring pads.

These advantages are obtained by making the scouring pad in a two-lobed form of a figure eight, one lobe of which serves as a handle to hold the pad firmly while scrubbing with the other lobe, the latter, when worn-out, being then used as a handle, the scrubbing being then performed with the first lobe.

The pad is made preferably of tubular meshwork or wire-netting, rolled up to an annulus and constricted at its middle portion, to form the two lobes, by suitable means, such as a ligature, a ring, a bead, etc., or advantageously also by welding or soldering.

In the case of welding or soldering, this may serve moreover to fix to the pad, in the same operation, a label and if desired a metallic bond connecting a whole series of pads in a row, whereby the manufacturing process is considerably simplified.

In case the pad is constricted by means of a ring, this may have the form of a thick and broad annulus, or of a large bead placed on the pad and which may serve as a bearing for the fingers holding the pad by one of its lobes.

If the ring is made of wire, it can be placed on the pad by using a U-shaped die into which the middle portion of the pad to be constricted is forced and thereafter a U-shaped wire which will close to the form of a ring round the pad by following the curvature of the bottom of the die.

The ring can also be used for fastening to the pad a label and for connecting a series of pads in a row by means of a string or a wire passing through the rings of said pads.

The following description of the annexed drawings, given by way of example, will clearly explain the manner in which the invention can be performed.

Figure 1 is a front view of an eight-shaped scouring pad, constricted by welding.

Figure 2 is a side view of the same pad.

Figures 3 to 8 are diagrammatic views on a reduced scale of this pad at different manufacturing stages.

Figure 9 shows a modified execution of the welded or soldered pad.

Figures 1 and 2 show clearly the two-lobed form of the scouring pad $a$ and show how easily the pad can be firmly held in a hand by one of its lobes $b$ as a handle, permitting rubbing, with the other lobe, the objects to be scoured. It is also obvious that, as the lobe which is held in the hand is not subjected to wear, it can be used in its turn for rubbing when the first lobe of the pad has become worn. In this way there is actually obtained two pads in one.

According to the preferred method of manufacture, shown in Figures 3 to 8, the pad is made from a section of tubular metallic knit work $a$ (shown in longitudinal section in Figures 3, 4 and 5), both ends of which are rolled up on themselves until the outer rolls $a^1$, $a^2$, thus formed, join together (Figure 4), whereafter the rolls are turned inward (Figure 5). In this way there is obtained a blank in the form of a turban or annulus (Figure 6), which then is pinched between two welding electrodes $c$ (Figure 7) for constricting it at the middle portion and establishing the weld $d$ between the lobes $b$.

The welding can be by fusion or soldering. Advantageously it will serve also for fixing to the pad, in the same operation, a label $e$ of paper, of fabric or of another material, bearing for example a trade mark and/or other indications, and a continuous metal strip $f$ (Figure 8) connecting successively manufactured pads in a row. The label $e$ is placed either inside the pad, between the sides of the annulus which are joined by welding or soldering, or on the outside between the pad and the metal strip $f$ welded or soldered to the pad. It will only be necessary to tear the thin metal strip between the pads if it is desired to separate the latter for separately selling them. The two-lobed shape of the pad permits suspending it on a nail, a hook, etc., without the necessity of providing it with a suspension ring, either of the lobes serving this purpose.

According to the modified form shown in Figure 9 the annular blank is twisted at its middle portion, so that its sides will cross each other instead of being simply juxtaposed, as in the foregoing example, the crossed sides being welded or soldered to each other at $d^1$.

It is also possible to constrict the middle portion of the pad by means of a tie, or otherwise, instead of welding or soldering it.

Figures 10, 11:
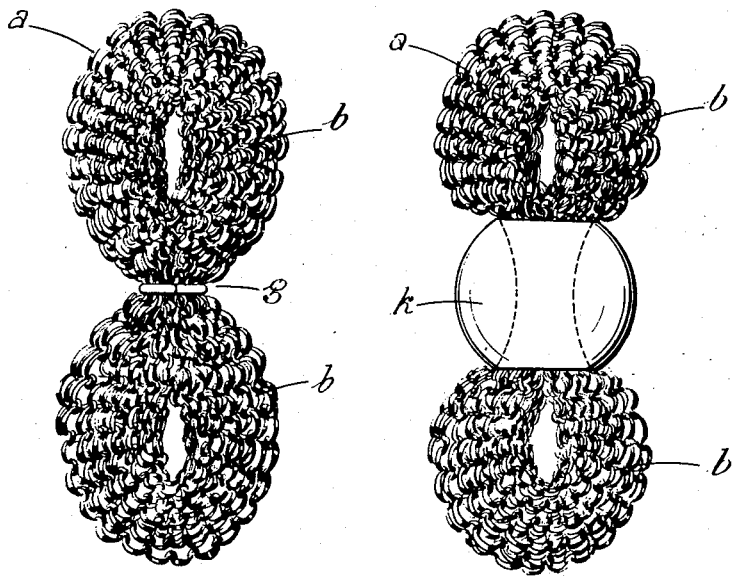
Figure 10 is a front view of a pad constricted by means of a thin ring, in the form of an annulus.
Figure 11 is a similar view of a pad constricted by means of a thick ring, in the form of a bead.
Figures 12, 13:
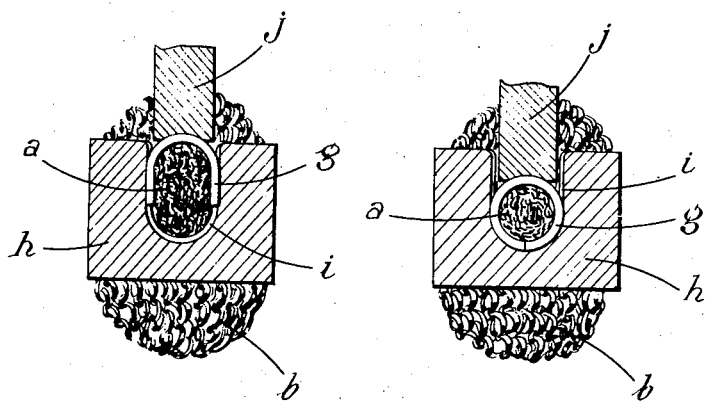
Figures 12 and 13 show diagrammatically the manner in which the ring of a pad according to Figure 10 is placed on the pad.

For manufacturing the pad $a$ shown in Figure 10, which is constricted between its lobes $b$ by means of a wire ring $g$, a blank rolled up to an annulus is flattened for introducing its middle portion between the arms of a die $h$, a cross section of which is shown in Figure 12. This die, which is U-shaped, presents on the inside of its arms a groove $i$ into which is introduced, over the pad blank $a$, a U-shaped wire $g$. By means of a stamping device $j$ the blank $a$ and the wire $g$ are forced into the die, the blank being thereby constricted, whereas the arms of the wire are bent along the curvature of the groove $i$ until they join together under the blank $a$ (Figure 13).

Thus, the constriction of the middle portion of the pad and the placing of the ring $g$ around this constricted portion are performed in a single operation.

The U-shaped wires can be produced from a continuous wire brought over the die $h$, where the wire is cut off and brought to the form of a U by means of a mechanism similar to that of a brush making machine. This mechanism and that which actuates the stamp $j$ can be connected to each other in such a manner as to render automatic the production of the U wires, the constriction of the pad and the placing of the ring.

If desired, a plurality of rings can be placed on the constricted portion of the pad.

The ring can also be flat and thinner than the ring $g$ shown in Figure 10, or it can be made broader and thicker, thereby being in the form of a large bead $k$, as shown by way of a modified example in Figure 11. If desired a wooden bead in the form of a ball; an oval knob or another form can be used for this purpose. If it is of sufficient volume it will have the advantage of making the pad buoyant.

Figure 14:
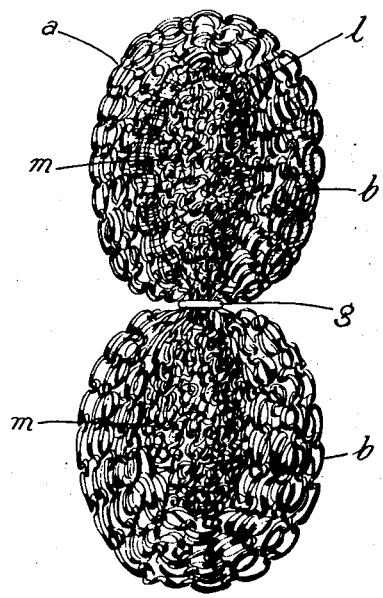
Figures 14 and 15 are, respectively, a front view and a longitudinal section of a pad composed of two blanks located one within the other.
Figure 15:
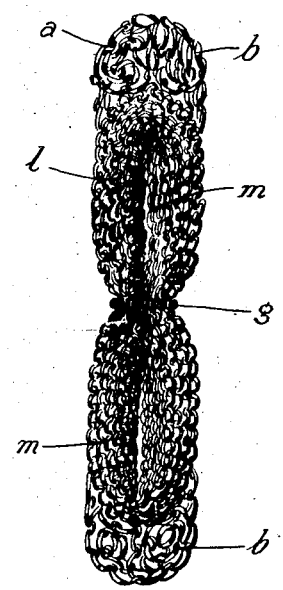

In the example shown in Figures 14 and 15 the pad $a$, which is constricted between the lobes $b$ by means of a ring $g$, has added thereto a second pad $l$ which is of similar shape but is of smaller size and the lobes $m$ of which fill up the hollow within the central portion of the lobes $b$. For manufacturing this pad, two tubular blanks of wire-mesh or wire-netting are placed crosswise, one into the other, and are constricted at their middle portion by means of a ring $g$. In the finished pad no hollow will appear, the hollow at the center of the lobes $b$ being filled up by the lobes $m$, whereas the hollow within these latter is concealed by the lobes $b$, due to the crosswise disposition of the two blanks. Thus, there is obtained a well stuffed pad which is capable of long use without showing wear.

Figure 16:
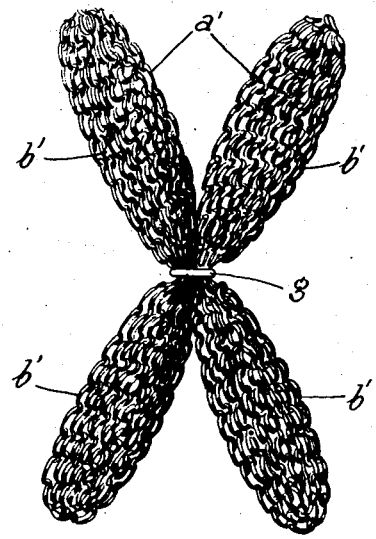
Figure 16 is a side view of a butterfly-shaped pad.

The butterfly-shaped pad $a'$, shown in Figure 16, is composed of two figure 8-shaped pad-blanks, the lobes $b'$ of which diverge on either side of the ring $g$ which constricts the two blanks, together, at their middle portion. For manufacturing this pad the two blanks may be placed side by side, as shown, or they may be arranged crosswise either by juxtaposition or by passing one through the other. The pad obtained in this way has the advantage of affording a larger surface than the previously described pad and at the same time as easy to manipulate as the latter.

Figure 17:
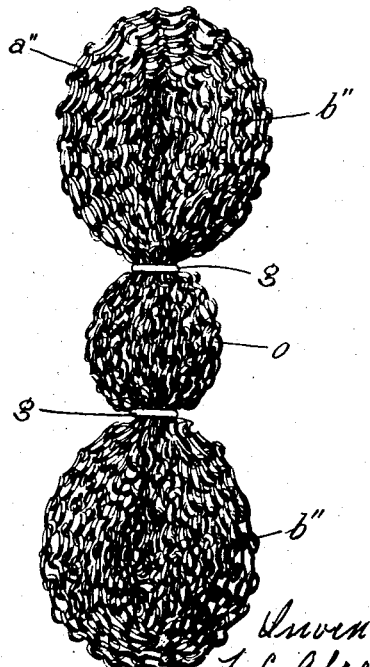
Figure 17 is a front view of a pad with a bulging middle portion.

According to Figure 17 the pad $a''$ has at its middle portion a bulge $o$ between its two lobes $b''$, and constricted at two places, instead of one, by two rings $g$. This imparts to the pad a firmer consistency and offers a better grip to the hand which holds the lobe serving as a handle, with the fingers resting on the bulge $o$.

A similar bulge can be provided, by the same means, on the pads composed of two blanks, as for instance those shown in Figures 14 to 16.

Though the use of rings is preferable for constricting the pads, it is obvious that the rings can be replaced, in each case, by ties, welds, soldering or other convenient pad constricting means. Obviously, other modifications can be applied, with respect to the forms of execution and to the other details which have been described and shown by way of example only.

I claim:

1. A method of making a scouring pad comprising rolling upon itself from both ends inwards a tubular section of wire net thus forming two adjoining rolls, turning said rolls inside out, constricting the annulus thus obtained, and securing it at the constriction.

2. In a method of making a scouring pad as claimed in claim 1, constricting said annulus substantially across its diameter, thereby forming a pad having two lobes of equal size.

3. In a method as claimed in claim 1, constricting said annulus at two points symmetrically located with respect to its diameter, thereby forming a pad having two lobes of equal size and a bulging portion therebetween.

4. In a method as claimed in claim 1, twisting the annulus to the shape of a figure eight and then securing it at the constriction.

5. In a method as claimed in claim 1, soldering the annulus at the constriction.

6. In a method as claimed in claim 1, fitting a metal ring around said constriction thereby securing same.

7. A method of making a scouring pad comprising rolling upon itself from both sides inwards a section of tubular metal net thus forming two adjoining rolls, turning said rolls inside out thus obtaining an annulus, repeating the same operation with a second section of tubular metal net thus obtaining a second annulus, placing said annuli together, constricting them and securing them together at their constriction.

8. In a method as claimed in claim 7, placing the second annulus within the first annulus before constricting and securing them together.

9. A scouring pad made of wire net, said pad comprising a rolled annulus formed of a section of tubular net wound upon itself from both ends and forming two adjoining rolls, the ends of said tubular net being on the inside of said annulus and said rolls being joined on the outside of said annulus by a substantially straight strip of said tubular net forming an envelope protecting said rolls, and constricting means securing said envelope in a position preventing unrolling of the inner portion of the tubular net.

LEWIS CROWFORD ABRAHAM.

REFERENCES CITED

The following references are of record in the file of this patent:

UNITED STATES PATENTS

| Number | Name | Date |
|---|---|---|
| 1,482,016 | Kingman | Jan. 29, 1924 |
| 1,853,542 | Bradford | Apr. 12, 1932 |
| 1,963,529 | Protz | June 19, 1934 |

FOREIGN PATENTS

| Number | Country | Date |
|---|---|---|
| 414,099 | Germany | May 27, 1925 |